United States Patent Office 3,317,816
Patented May 2, 1967

3,317,816
INVERTERS USING CONTROLLED SEMI-
CONDUCTOR RECTIFIERS
Johannes Jacobus Wilting, Emmasingel, Eindhoven,
Netherlands, assignor to North American Philips
Company, Inc., New York, N.Y., a corporation of
Delaware
Filed Apr. 3, 1964, Ser. No. 357,119
Claims priority, application Netherlands, Apr. 10, 1963,
291,430
2 Claims. (Cl. 321—45)

ABSTRACT OF THE DISCLOSURE

A D.C. to A.C. converter comprising two controlled rectifiers operating in push-pull relationship and each alternately contained in a series inductance-capacitance circuit which is resonant at a frequency greater than the switching frequency of the rectifier. In order to reduce the peak voltage across the rectifiers during switchover, an inductance is contained in each series branch having a value approximating half of the total inductance of each series resonance branch. The two inductances are coupled together to form a transformer. Four circuit variations are disclosed.

This invention relates to inverters using controlled semiconductor rectifiers. In particular, it relates to such inverters which comprise at least one pair of push-pull connected controlled semiconductor rectifiers, the main current circuits of which are connected to a D.C. supply circuit in series with a resonant circuit having series-resonance properties, the resonant circuit being coupled with a load circuit. The rectifiers in such a circuit are alternately rendered conducting by control-pulses having a repetition frequency of less than twice the resonant frequency of the resonant circuit, the control pulses being alternately supplied to the control electrodes of the rectifiers.

Inverters of the above type are shown and described in U.S. Patent Numbers 3,229,226, issued January 11, 1966, and 3,241,039, issued March 15, 1966, and assigned to the assignee of the instant application. Self-generating inverters are also described in "Philips Technical Review," vol. 23, 1961/2, pages 272–278. Externally triggered inverters are described in the "Controlled Rectifier Manual" published by General Electric Co.

In both the self-generating and externally triggered types, the repetition frequency of the control-pulses supplied to the control electrode of each rectifier must be lower than the resonance frequency of the resonant circuit. The resonant circuit is shock-excited when a rectifier becomes conducting and the same rectifier cannot become non-conducting before the next-following zero passage of the current through the resonant circuit, i.e., before about half a period of the resonance frequency thereof. Before the other rectifier can be rendered conducting by the next-following control-pulse, a so-called restoring time must elapse, during which time the charge carriers accumulated in the first rectifier flow away and/or neutralize each other by recombination. With the controlled semiconductor rectifiers now available this restoring time is of the order of 10 µsec. and in practice a safety factor is included which ensures that the "waiting time" is, under all conditions, longer than the restoring time of the rectifiers. If one rectifier is not completely extinguished or re-ignites during the conducting period of the other rectifier, a short-circuit of the D.C. supply source results.

At the ignition of each rectifier the series resonant circuit is connected to the D.C. supply circuit. The supply voltage plus the residual voltage of the capacitor of the series resonant circuit is then effective across the inductance of the resonant circuit. At the cut-off of each rectifier the current becomes zero at an instant when the voltage across the inductance of the series resonant circuit still has a comparatively high value. These voltage jumps will therefore also be effective across the other rectifier.

The steep increase in the forward direction of the voltage across the non-conducting rectifier produces therein a small capacitive current, which may produce a premature ignition of this rectifier. On the other hand, the forward voltage pulse produced at the cut-off of the other rectifier and superimposed on the voltage of the D.C. supply source, and on the instantaneous value of the voltage across the capacitive part of the resonant circuit, may reach or exceed the value of the forward ignition voltage of the non-conducting rectifier. This rectifier then ignites at or just before the instant of cut-off of the other rectifier, which involves the continued conduction of the extinguishing rectifier and a short-circuit of the D.C. supply source.

The invention has for its object to mitigate to a great degree the disadvantages set forth above of the prior art inverters and to provide an inverter in which it is ensured that conduction of a rectifier does not occur before cut-off of the other rectifier.

According to one aspect of the invention, the inductive part of the resonant circuit of the inverter consists of an inductor connected in the common supply circuit of the two rectifiers and of a transformer having two identical windings, each of which is connected in the main current circuit of one of the rectifiers and has an inductance whose value approximates but is no greater than half the total inductance of the resonant circuit. By this means, the voltage pulses produced across the inductor at the ignition and at the cut-off of one of the rectifiers and effective in the main current circuit of the other, then non-conducting, rectifiers are substantially compensated by corresponding voltage pulses induced in the associated winding of the transformer.

Somewhat similar inverters for use with gas discharge triodes are shown in United States Patents 1,838,001 and 1,923,696. In these patents, the inductive part of the series resonant circuit consists mainly of a transformer having two identical windings, each of which is included in the main current circuit of one of the gas discharge triodes. This transformer serves as an inductive part of the resonant circuit and also brings about the cut-off of one of the rectifiers at the ignition of the other. This mode of operation can only be used with the comparatively insensitive gas discharge tubes and for producing an alternating current of low frequency. A great advantage of the use of controlled semiconductor rectifiers in such inverters in that it is possible to produce an alternating current of comparatively high frequency, for example, of 7000 c./sec. or more with a very high efficiency of for example 85%. With high frequencies the steepness of the current and voltage variations $di/dt$ and $dv/dt$ is correspondingly greater, so that a restoring time for each rectifier is necessary. The aforesaid disadvantages of the known inverters considerably reduce the values of the D.C. supply voltage and/or of the rectifier peak current permissable with controlled semiconductor rectifiers of a given type and with a given output frequency.

The invention will now be described with reference to the drawing, in which.

Figures 1, 2:
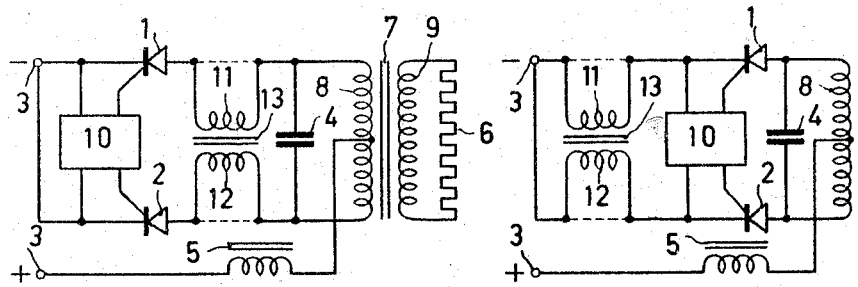
FIG. 1 is a schematic circuit diagram of one embodiment of an inverter according to the invention.
FIG. 2 shows a modification of FIG. 1.

The embodiment of FIG. 1 is shown as applied to the push-pull inverter illustrated in FIG. 1 of said co-pending application Ser. No. 171,867, or in FIG. 3 of the article in "Philips Technical Review" noted above. It comprises two push-pull connected, controlled semi-conductor rectifiers 1 and 2, the main current circuits of which are connected to a D.C. supply source 3 in series with a resonant circuit having series resonance properties and consisting of a capacitor 4 and a choke 5. This resonant circuit is coupled with a load circuit 6 by means of transformer 7 which includes a primary winding 8 having a center tap and a secondary winding 9. The main current circuit of each controlled rectifier thus includes not only the choke 5 but also half the primary winding 8. The impedance of this half winding is equal to be transformed impedance of the load 6 in parallel with the transformed capacitive impedance of the capacitor 4. The controlled rectifiers 1 and 2 are controlled by a pulse source 10 which has two separate outputs, each being connected between the cathode of one of the rectifiers 1 and 2 and its control-electrode. The source 10 is arranged so that it supplies positive control-pulses alternately to the rectifiers 1 and 2, the control-pulses having a repetition frequency which is less than twice the resonance frequency of the resonant circuit including the transformed capacitor 4 and the choke 5.

Figure 3:
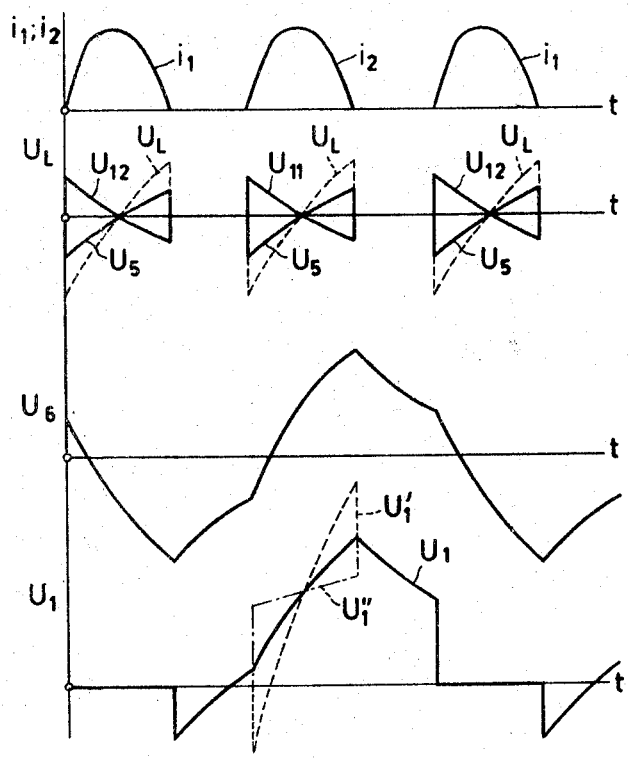
FIG. 3 shows a current and voltage time diagram illustrating the operation of the embodiment shown in FIG. 1.

FIG. 3 shows current and voltage time diagrams illustrating the operation of the push-pull inverter shown in FIG. 1. On the upper line are plotted the current pulses passing alternately through the main current paths of the rectifiers 1 and 2 in response to the occurrence of each control pulse. On the second line there is shown the voltage $U_L$ produced across the choke 5 at each switching of one of the rectifiers 1 and 2. The third line indicates the voltage produced across the load 6 and the fourth line shows the voltage across the rectifier 1.

The broken curves $U_L$ and $U_1'$ of the second and fourth lines of FIG. 3 are those occurring in a push-pull inverter in which the anodes of the rectifiers 1 and 2 are directly connected to the common junctions of the capacitor 4 and the winding 8. From the curves it can be seen that the voltage produced across the choke 5 during the conducting period of a rectifier produces an increase in the reverse peak voltage $U_1'$ across the other (extinguished) rectifier, a peak of forward voltage across said other rectifier, and between these, a steeper increase in the reverse voltage across said other rectifier. The peak of forward voltage operating across a rectifier subsequent to the cut-off thereof and produced by the ignition of the other rectifier may produce a reignition of the first rectifier just at the instant when the other rectifier ignites. Moreover, the increase in reverse voltage across a rectifier may produce a reignition of the same: this may be due to the high value of the differential quotient $dv/dt$ of the voltage across this rectifier which produces a capacitive current capable of turning on the rectifier. Finally, the reverse voltage across each rectifier is raised by the voltage across the choke 5, so that under given conditions the permissible value of reverse voltage for the chosen rectifier may be exceeded.

The voltage jump produced across the choke 5 at the ignition and at the cut-off of each rectifier is therefore useful to further the ignition and the cut-off respectively of said rectifier, but these jumps are undesirable for the other rectifier. In order to mitigate these conditions, according to the invention, the inductance of the choke 5 has a value which is, for example, half the value which it would ordinarily have with the same value of the capacitor 4 and of the series resonance frequency of the resonant circuit; in addition, the remaining part of the inductance of said resonant circuit is formed by a transformer 13 having identical windings 11 and 12, each of which is included in the main current circuit of one of the rectifiers 1 and 2 respectively. The value of inductance of each winding is approximately equal to but no greater than half the total inductance of the resonant circuit. Under these conditions the voltage pulses produced across the inductor 5 at the ignition and at the cut-off of one of the rectifiers (for Example 2) are compensated in the main circuit of the other then non-conducting rectifier (for Example 1) by corresponding voltage $U_{11}$ or $U_{12}$ induced in the associated winding (for Example 11) of the transformer 13 by the other winding (for Example 12). This is illustrated by the full-line curves $U_{11}$ and $U_5$ and $U_{12}$ and $U_5$ respectively on the second line of FIG. 3. As can be seen by the full-line curve on the fourth line of FIG. 3, as a result of this compensation the maximum reverse voltage across each of the rectifiers 1 and 2 drops and the forward voltage pulse produced at the time of ignition of a rectifier across the other rectifier is at least partly suppressed and the steepness of increase of the reverse voltage across each rectifier during the conducting period of the other rectifier is considerably decreased.

If the inductance of each of the windings 11 and 12 were greater than half the total inductance of the resonant circuit with the capacitor 4 and the choke 5, over-compensation would occur. This would result in the voltage across each rectifier being as indicated by do-and-dash lines in $U_1''$ on the fourth line of FIG. 3. This would be very unfavorable, since the voltage pulse produced at the cut-off of one rectifier across the other rectifier would be capable of igniting this rectifier capacitively due to the very high $dv/dt$ value.

FIG. 2 is a circuit diagram of a modification of the embodiment of FIG. 1. As can be seen, the windings 11 and 12 of the transformer 13 are included in the cathode circuits of the rectifiers 1 and 2 instead of in the anode circuits as in FIG. 1. The operation of the embodiment of FIG. 2 is the same as that of the circuit of FIG. 1. However, the outputs of the control-pulse source 10 are not directly connected to the terminals of the supply source 3, so this pulse source must be coupled with the control-circuits of the rectifiers 1 and 2 by means of transformers.

Figure 4:
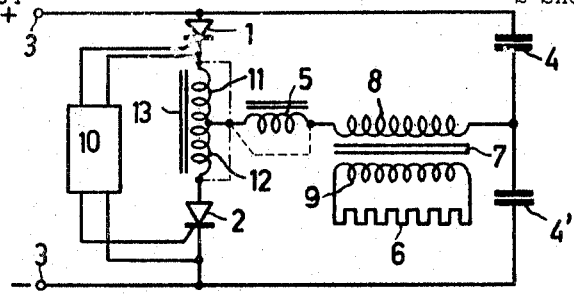
FIG. 4 is a schematic circuit diagram of a second embodiment.
Figure 6:
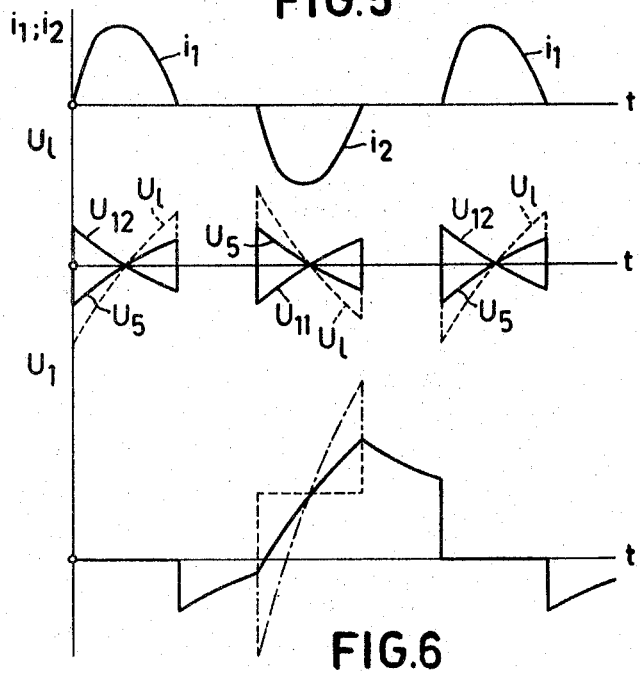
FIG. 6 shows a current and voltage time diagram illustrating the operation of the embodiment shown in FIG. 5.

The embodiment shown in FIG. 4 illustrates the use of the invention in a unilateral push-pull inverter of the kind shown in FIG. 6 of the above-noted Patent No. 3,229,226. It comprises two controlled semiconductor rectifiers 1 and 2 which are connected in series with each other through a D.C. supply source 3. The junction of the cathode of the rectifier 1 and the anode of the rectifier 2 is connected to the source 3 by means of a series resonant circuit comprising a choke 5 and capacitors 4 and 4'; a load 6 is coupled to the circuit by means of a transformer 7 having a primary winding 8 and a secondary winding 9. The two rectifiers are alternately rendered conducting by positive control-pulses supplied to the cathode and control-electrode by a pulse source 10.

The capacitor 4 is therefore charged through the rectifier 2 and discharged through the rectifier 1, while capacitor 4' is charged through the rectifier 1 and discharged through the rectifier 2. FIG. 6 shows voltage and current time diagrams illustrating the operation of the circuit of FIG. 4. The first line of FIG. 6 shows the current pulses passing alternately through the main current path of the rectifiers 1 and 2 in response to the occurrence of the control pulses. The second line shows in broken lines the voltage $U_L$ occurring across the choke 5 in the absence of any other inductive element in the resonant circuit; the full lines indicate the voltages $U_5$, $U_{11}$ and $U_{12}$ produced across the same choke and across a further inductive part of the resonant circuit during each conducting period of the rectifiers 1 and 2. Finally, the last line of FIG. 6 shows the variation of the voltages $U_1$ and $U_1'$ respectively across a rectifier.

In accordance with the invention, the embodiment of FIG. 4 includes a choke 5 and a transformer 13 having windings 11 and 12, these windings being connected in series with each other between the cathode of the rectifier 1 and the anode of the rectifier 2, the junction of these two windings being connected to the remaining part of the resonant circuit. Consequently, as in the embodiments of FIGS. 1 and 2, part of the inductance of the resonant circuit is formed alternately by the windings 11 and 12, the winding not forming part of the inductance then serving to produce a compensation voltage in the circuit of the non-conducting rectifier. The dot-dash lines in FIG. 4 are the circuit connections of a circuit without the transformer 13, and the broken lines indicate the circuit connections of the circuit without the choke 5.

The broken-line curves of the second and third lines of FIG. 6 illustrate the voltage variations in the absence of the compensation transformer 13 (circuit indicated in dot-dash lines in FIG. 4) and the dot-and-dash curve of the third line indicates this variation with the use of a transformer 13 (choke with center tap but without a common choke 5; the latter condition corresponds to what might be termed overcompensation). It will be seen that in this case mainly the maximum reverse voltage is reduced across each rectifier by the compensation, while in the absence of a choke 5 or of the transformer 11–13 troublesome voltage pulses are produced across the nonconducting rectifier at the ignition and/or the cut-off of the other rectifier; these pulses may result, under certain conditions, in a reignition of the first-mentioned rectifier.

Figure 5:
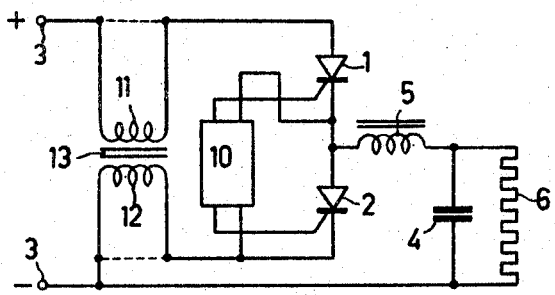
FIG. 5 shows a modification of FIG. 4.

FIG. 5 is a circuit diagram of a modification of the embodiment of FIG. 4, in which, as is shown in FIG. 8.47 of "Controlled Rectifier Manual," the load 6 is coupled by means of a single capacitor 4, which replaces the capacitors 4 and 4' of FIG. 4. In this modification the transformer 13 includes two separate windings 11 and 12, which are connected between the positive terminal of the source 3 and the anode of the rectifier 1 and between the negative terminal of the source 3 and the cathode of the rectifier 2 respectively. The operation of this modification is identical to that of the embodiment shown in FIG. 4.

It is thus seen that applicant has devised a circuit arrangement adapted to be applied to different types of inverters using controlled semiconductor rectifiers, which circuit arrangement allows for reliable switching operation with less danger of short-circuiting.

While the invention has been described in relation to specific embodiments, many modifications and variations thereof will be readily apparent to those skilled in the art without departing from the inventive concept, the scope of which is set forth in the appended claims.

What is claimed is:

1. An inverter comprising: at least one pair of push-pull connected, controlled semiconductor rectifiers each having a main current circuit and a control electrode, the main current circuits being connected to a D.C. supply circuit in series with a resonant circuit having inductive and capacitive portions and having series resonance properties, means for coupling said resonant circuit with a load circuit, means for alternately applying control pulses to said control electrode to render the rectifiers alternately conducting with a repetition frequency of less than twice the resonance frequency of the resonant circuit, the inductive portion of the resonant circuit consisting of an inductor connected in said common supply circuit of the two rectifiers and of a transformer having two identical windings, each winding being connected in the main current circuit of one of the rectifiers and having an inductance substantially equal to and no greater than half the total inductance of the resonant circuit, the voltage pulses produced across the inductor at the ignition and at the cut-off of one of the rectifiers and effective in the main current circuit of the other rectifier being substantially compensated by corresponding voltage pulses induced in the associated winding of the transformer.

2. An inverter comprising: at least one pair of push-pull connected, controlled semiconductor rectifiers each having a main current circuit and a control electrode, the main current circuits being connected to a D.C. supply circuit in series with a resonant circuit having inductive and capacitive portions and having series resonance properties, means for coupling said resonant circuit with a load circuit, a separate pulse generator having at least two outputs respectively connected to the control electrodes of the rectifiers for alternately applying control pulses to said control electrodes to render the rectifiers alternately conducting with a repetition frequency of less than twice the resonance frequency of the resonant circuit, the inductive portion of the resonant circuit consisting of an inductor connected in said common supply circuit of the two rectifiers and of a transformer having two identical windings, each winding being connected in the main current circuit of one of the rectifiers and having an inductance substantially equal to and no greater than half the total inductance of the resonant circuit, the voltage pulses produced across the inductor at the ignition and at the cut-off of one of the rectifiers and effective in the main current circuit of the other rectifier being substantially compensated by corresponding voltage pulses induced in the associated winding of the transformer.

References Cited by the Examiner

UNITED STATES PATENTS

| 3,217,239 | 11/1965 | Lunney | 321—18 X |
| 3,263,152 | 7/1966 | Walker | 321—45 |
| 3,274,479 | 9/1966 | Krimura et al. | 321—16 X |

JOHN F. COUCH, *Primary Examiner.*

W. M. SHOOP, *Assistant Examiner.*